United States Patent

[11] 3,620,373

| [72] | Inventors | Jesse D. Crell<br>White Plains;<br>Samuel Sze, Great Neck, both of N.Y. |
|---|---|---|
| [21] | Appl. No. | 887,171 |
| [22] | Filed | Dec. 22, 1969 |
| [45] | Patented | Nov. 16, 1971 |
| [73] | Assignee | Trade Bank and Trust Company<br>New York, N.Y. |

[54] CLOSED-LOOP PROCESSING APPARATUS
9 Claims, 8 Drawing Figs.

[52] U.S. Cl. .................................................. 210/189,
210/328, 210/354
[51] Int. Cl. ..................................................... B01d 35/08
[50] Field of Search ........................................... 210/33,
189, 284, 269, 325, 328, 354

[56] References Cited
UNITED STATES PATENTS
2,731,149   1/1956   Findlay ......................... 210/189
3,298,524   1/1967   Gaudfrin ....................... 210/328 X

*Primary Examiner*—Frank A. Spear, Jr.
*Attorney*—Barnard, McGlynn & Reising

ABSTRACT: Apparatus for continuously processing fluids includes a hollow torus having a plurality of discs positioned therein containing chemicals enclosed in filtering paper for processing the fluids. The discs are connected together and continuously driven around the enclosed circle formed by the torus. The torus is divided into two compartments by rubber dividers each having a diametrical slit through which the discs move when passing between compartments. The discs are normally disposed in a plane perpendicular to the movement of fluid through the torus but tilt into a plane parallel to the fluid movement when passing through the slits. Each compartment has a fluid inlet and outlet. In one compartment the fluid is filtered and chemically treated by passing through the discs. In the other compartment the discs are washed and the chemicals regenerated.

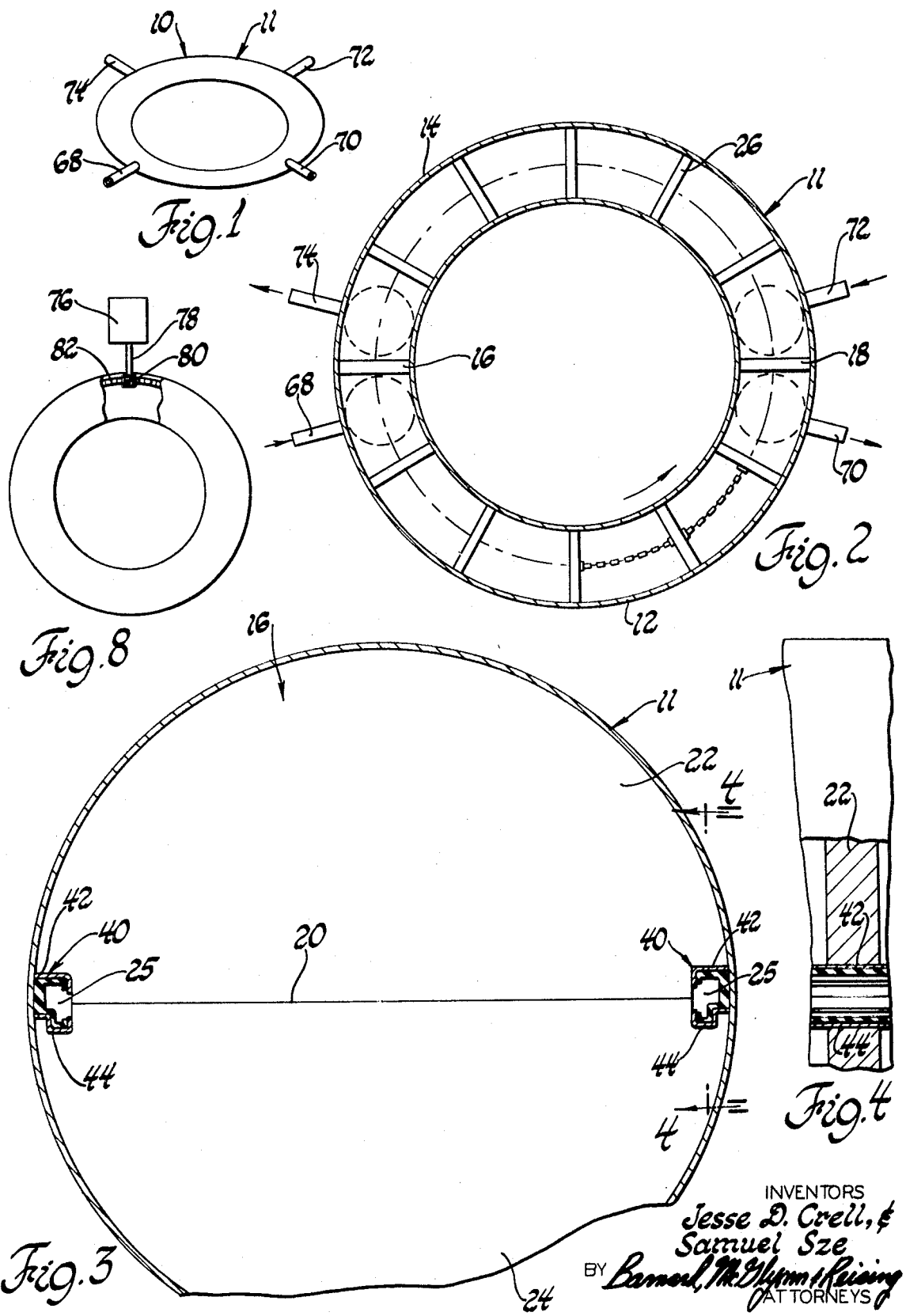

INVENTORS
Jesse D. Crell, &
Samuel Sze 3,620,373

CLOSED-LOOP PROCESSING APPARATUS

BACKGROUND OF THE INVENTION

1. Field of the Invention

This invention relates to apparatus for physically and chemically processing liquids, such as filters, ion exchange devices and the like wherein the fluid is passed through filters or chemical masses, and more particularly to such systems wherein the physical members through which the fluid is passed are processed, so as to reactivate them on a regular basis.

2. Description of the Prior Art

In the prior art liquid to be processed is passed through filters or chemical masses where the desired processing takes place. During the processing operation the same filters or chemical masses are continuously used until the filters become clogged or the chemicals exhausted. At this time the processing operation is discontinued until the filters are cleaned or replaced or the chemicals regenerated. The disadvantages of such a system is the necessity of having to shut down the processing operation during the cleaning or regenerative operation.

SUMMARY OF THE INVENTION

The present invention overcomes the prior art difficulty by providing an apparatus taking the form of a hollow torus for continuously processing fluids. The torus is separated by a plurality of dividers into a plurality of compartments each having a fluid inlet and outlet. A plurality of permeable members for processing the fluid are driven around the torus from compartment to compartment. In some compartments the fluid passes through the members and is processed thereby, while in other compartments the fluid passes through the members and washes the filters or regenerates the chemicals contained therein.

One preferred embodiment of the invention, which will be described in more detail, is particularly adaptable to ion exchange water softening. In this embodiment the torus preferably lies in the horizontal plane and is divided into two equal compartments by means of two rubber dividers. Each divider has a central diametrical slit extending horizontally across the entire width thereof, but allowing only a minimum amount of fluid leakage between the two compartments.

A plurality of circular discs normally lying in vertical planes are evenly spaced within the torus and are attached together by chains extending from their centers. The discs are formed from a plastic structural cage having compartments for containing a resin such as polystyrene-divinyl benzene sulfonate or other chemical material for processing the fluids. The cage and resin are covered by a filtering material. The discs are maintained in position by two pivoting pins, located on the horizontal center line, and slidably mounted in a pair of tracks attached to the inner surface of the torus. A flange of rubber provided around the periphery of each disc forms a fluid seal with the inside of the torus.

Each compartment has a fluid inlet and outlet. As fluid is pumped through the first compartment it is purified or otherwise chemically treated on passing through the discs. The discs are pushed around the torus by the force exerted on them by the fluid flow. Since the discs are connected together by chains, all of them are pushed around the torus by the force. As a disc approaches a divider between the compartments it is positioned into a horizontal plane by means of ramplike profiles formed on the rails, which act on studs extending from the pivot pins. In this position the disc can slip through the horizontal slit formed in the divider. Once the disc has passed through the divider it is repositioned into a vertical plane. In the second compartment a fluid is pumped through the discs washing them and preferably regenerating the resin or chemical material.

This arrangement provides a number of advantages over prior art fluid processing devices. The invention provides means for continuously processing fluid while simultaneously introducing freshly washed filters and regenerated chemical material.

BRIEF DESCRIPTION OF THE DRAWINGS

FIG. 1 is a perspective view of a torus representing one embodiment of the present invention;

FIG. 2 is a view of the torus having the top section removed showing the arrangement of the internal components;

FIG. 3 is an enlarged front elevation view of a divider;

FIG. 4 is a side elevation view of the divider shown in FIG. 3;

FIG. 8 is a diagrammatic view of a second embodiment of the present invention.

DESCRIPTION OF THE PREFERRED EMBODIMENT

Figures 5, 6:
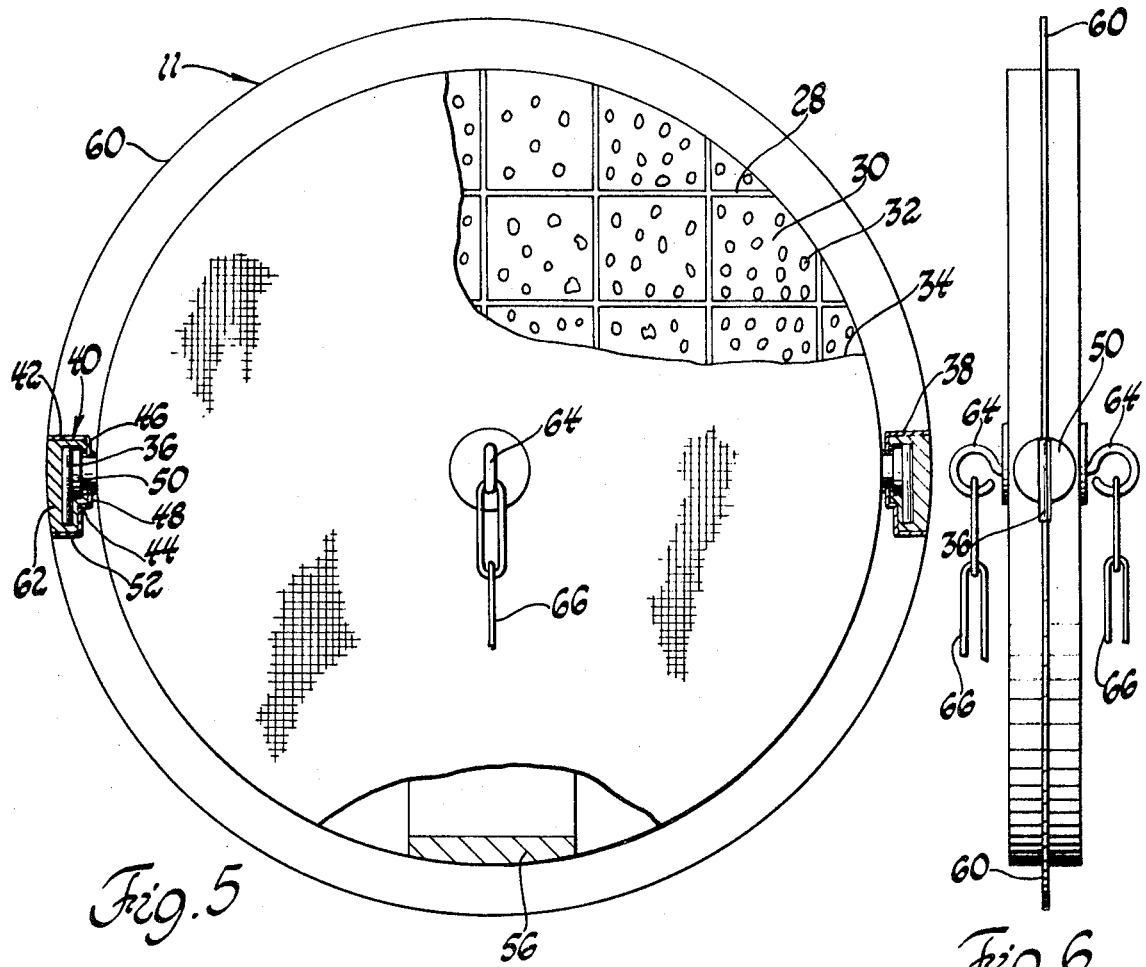
FIG. 5 is an enlarged front elevation view of the discs having part of the outside filter material removed.
FIG. 6 is a side elevation view of the discs shown in FIG. 5.

Although the present invention will be described as adapted to ion exchange water softening, it should be understood that it is not intended to limit the invention to this particular application. It is to be understood that the invention relates to fluid processing in general.

Referring to the drawings, FIG. 1 illustrates a toroidal shaped fluid processing system generally indicated at 10 and preferably disposed in the horizontal plane. Outer housing 11 of the system is preferably circular in shape, as is illustrated in FIG. 3. The size of the toroidal system is not important to the present invention and will depend upon the amount of fluid desired to be processed.

The toroidal system 10 is divided into preferably two compartments 12 and 14 by circular disc shaped dividers 16 and 18 disposed within the housing, as shown in FIG. 2. In the alternative the system may be divided into as many compartments as desired. Each divider lies in a vertical plane with its outer periphery sealed to the inner surface of the housing 11. Dividers 16 and 18 are formed of rubber or other resilient material and are constructed as is shown in more detail in FIGS. 3 and 4, having a horizontal diametrical slit 20 extending across its length separating the divider into two identical halves 22 and 24. At both ends of slit 20 the divider is cut away to allow rails 40 to project through. The edges of the cut away portion are sealed to the top of pieces 42 of rails 40 and the bottom of pieces 44. Flaps 25 disposed between pieces 42 and 44 adjacent each divider are secured by any convenient means to the inner surface of housing 11. The flaps are formed of rubber or other resilient material and are in sealing contact with pieces 42 and 44 and the divider to prevent leakage of fluid therethrough.

Figure 7:
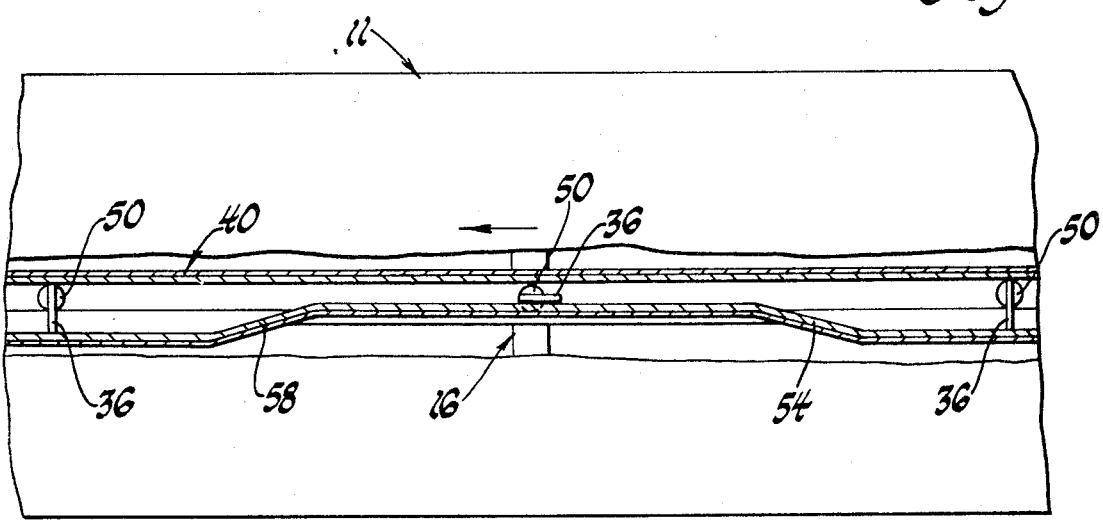
FIG. 7 is a view of a section of the torous showing in more detail the operation of the components.

A plurality of discs 26 normally disposed in vertical planes are positioned within the torus. Each disc 26, more fully shown in FIGS. 5 and 6, is formed from a plastic structural cage 28 forming compartments 30 for containing resin 32 or other chemical material used in the processing of the fluids. Cage 28 is covered with filtering material 34 of any desired type. Although disc 26 is shown in the preferred embodiment with both chemical and filtering material, an alternative to the structure would be to have only one type of fluid processing material. Cylindrically shaped pivoted pins 36 having enlarged ends 38 extend from each side of disc 26 along the horizontal centerline and are secured to cage 28 by any conventional means. Pins 36 are slidably mounted in rails 40 that are attached to the inside surface of housing 11 by welding or other convenient means as is shown in FIG. 7. Each rail 40 is formed from two strips of metal 42 and 44 having inturned flanges 46 and 48, respectively, for slidably securing enlarged ends 38. Each pin 36 is formed with a stud member 50 on the end of enlargement 38 lying in the same plane as the disc 26 and slidably mounted in groove 52 formed in strip 44. As discs 26 move around housing 11 and approach divider 18 or 18, members 50 engage ramp 54 formed on strip 44 rotating the disc into a horizontal plane, as shown in FIG. 7. In this position disc 26 can slide through slit 20 formed in the divider. After the disc has passed through the slit, it is rotated back into a vertical plane by metal weight 56, while member 50 descends ramp 58 formed on piece 44.

Discs 26 are each provided with an outer flange 60 of rubber or other resilient material forming a fluid seal with the interior walls of housing 11. Flange 60 is cut away at the two sides to provide access for rails 40, but is in contact with the top of strip 42 and the bottom of strip 44 to prevent leakage of fluid therethrough. A coating 62 of rubber or other resilient material is provided on the bottom side of strip 42, the tip side of strip 44 and the portion of the inner surface of housing 11 between the two strips for forming a fluid seal with pins 36.

A pair of circular eyelets 64 attached to disc 26 by any convenient means extend from the center of each side of the disc. A set of chains 66 attached to the eyelets connect the discs together and maintain a spaced relationship between them.

Compartment 12 is provided with fluid inlet 68 and outlet 70. Compartment 14 has inlet 72 and outlet 74. The fluid entering inlet 68 passes through discs 26 where it is filtered by material 34 and chemically treated by resin 32, after which it leaves through outlet 70. As the fluid passes through discs 26 a force is created thereon tending to move the discs in a counterclockwise direction, as is illustrated in FIG. 2. Due to chains 66 this force moves all of the discs in a counterclockwise direction, resulting in all the discs continually moving around the system from one compartment, through the dividers to the other compartment. Fluid entering inlet 72 passes through the discs 26 washing the material 34 and regenerating resin 32 before it leaves through outlet 74. The fluid flow in compartment 14 also helps to move the discs around the system in the counterclockwise direction.

Although in the preferred embodiment the discs are moved around the system by the force of the fluid therethrough, an alternative embodiment, as shown in FIG. 2, would be to have motor 76 propel discs 26 by means of shaft 78 that extends through housing 11. A seal is provided around shaft 78 to prevent the leakage of fluid from housing 11. Gear 80 positioned on the end of shaft 78 engages chain 82, which is attached to pivot pins 36. With an outside driving means, the direction of fluid flow could be opposite to the movement of the discs. A further alternative to the preferred embodiment would be to reverse the direction of flow of one of the fluids, resulting in one of the fluids propelling the discs and the other fluid flowing opposite to the movement of the discs.

In operation, fluid to be processed enters compartment 12 through inlet 68 and passes through discs 26 where it is filtered and chemically treated before leaving through outlet 70. The fluid flow through the discs exerts a force that moves them in the counterclockwise direction around the toroidal system. As the moving discs approach divider 18 stud member 50 formed on pins 36 engage ramp 54 formed on rail piece 44 turning disc 26 into a horizontal plane. In this position the disc passes through slit 20 formed in divider 18, while rubber flaps 25 are temporarily bent back by pins 36. Having passed through slit 20, the disc is rotated back into a vertical position by offsetting weight 56, while member 50 slides down ramp 58.

In compartment 14 fluid enters inlet 72 and passes through discs 26 cleaning filtering material 34 and regenerating chemical material 32 before leaving through outlet 74. This fluid flow through the discs also helps to move the discs counterclockwise around the system. As the discs approach divider 16 they are again rotated into a horizontal plane for passing through slit 20.

As described, the discs continuously move around the toroidal system, filtering and chemically processing fluid while in compartment 12 and being washed and chemically regenerated in compartment 14. Thus, a system for continuously processing fluid is provided.

We claim:
1. An apparatus for processing fluids, comprising:
  a. an elongated, continuous, closed, hollow housing;
  b. a plurality of dividers disposed at spaced intervals within said housing and dividing said housing into a plurality of separated compartments;
  c. one fluid inlet and one outlet associated with a compartment;
  d. and a member within said housing for processing the fluid, said member being supported for motion around said housing.

2. An apparatus as described in claim 1, wherein fluid introduced into said compartments propel said members around the housing.

3. An apparatus as described in claim 1, wherein a motor means is operatively connected to said members for propelling the members around said housing.

4. An apparatus as described in claim 1, wherein some of said compartments fluid passes through said members processing said fluid, and in other compartments fluid passes through said members washing or otherwise regenerating the members.

5. An apparatus as described in claim 1, wherein said members are operatively connected together and equally spaced around said housing.

6. An apparatus as described in claim 1, wherein said dividers are formed of a resilient material having a diametrically extending slit allowing said members to pass from compartment to compartment.

7. An apparatus as described in claim 1, wherein said members are circular discs normally positioned in a plane substantially perpendicular to the flow of fluid through said housing, said member being rotated to a position substantially perpendicular to their normal position when passing from one compartment to another.

8. An apparatus as described in claim 7, wherein said members are formed from a plastic structural cage having compartments for containing chemical material, said cage and material being covered with filtering material.

9. An apparatus as described in claim 8, wherein said members have a pivoting pin extending from each side, each pin being slidably mounted in a rail attached to the inside surface of said housing.

* * * * *